United States Patent
Kennedy

(10) Patent No.: US 9,098,706 B1
(45) Date of Patent: Aug. 4, 2015

(54) INSTALLER TRUST CHAIN VALIDATION

(75) Inventor: Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 2311 days.

(21) Appl. No.: 11/496,852

(22) Filed: Jul. 31, 2006

(51) Int. Cl.
| | | |
|---|---|---|
| G06F 9/445 | (2006.01) | |
| G06F 12/14 | (2006.01) | |
| G06F 12/16 | (2006.01) | |
| G06F 11/00 | (2006.01) | |
| G06F 21/57 | (2013.01) | |
| G06F 21/56 | (2013.01) | |
| H04L 9/32 | (2006.01) | |

(52) U.S. Cl.
CPC ............ G06F 21/572 (2013.01); G06F 21/566 (2013.01); H04L 9/3247 (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 5,926,549 | A * | 7/1999 | Pinkas ........................... | 713/168 |
| 6,321,334 | B1 * | 11/2001 | Jerger et al. ....................... | 726/1 |
| 6,367,012 | B1 * | 4/2002 | Atkinson et al. ............... | 713/176 |
| 6,725,377 | B1 * | 4/2004 | Kouznetsov ..................... | 726/23 |
| 7,392,545 | B1 * | 6/2008 | Weber et al. .................... | 726/25 |
| 2001/0014943 | A1 * | 8/2001 | Wray ............................. | 713/157 |
| 2004/0003266 | A1 * | 1/2004 | Moshir et al. .................. | 713/191 |
| 2004/0148514 | A1 * | 7/2004 | Fee et al. ........................ | 713/200 |
| 2004/0250086 | A1 * | 12/2004 | Maucher ........................ | 713/187 |
| 2005/0097355 | A1 * | 5/2005 | England et al. ................ | 713/200 |
| 2005/0132357 | A1 * | 6/2005 | Shell et al. ..................... | 717/174 |
| 2005/0188203 | A1 * | 8/2005 | Bhaskaran et al. ............ | 713/176 |

OTHER PUBLICATIONS

Blaze et al. Trust Management for IPsec. [online] (May 2002). ACM., pp. 1-24. Retrieved From the Internet <http://academiccommons.columbia.edu/download/fedora_content/download/ac:149454/CONTENT/tmipsec-tissec.pdf>.*
"*Windows Installer 2.0 Redistributable for Windows 95, 98, and Me*", pp. 1-3 [online]. Retrieved on Nov. 3, 2006. Retrieved from the Internet:<URL://www.microsoft.com/downloads/details.aspx?FamilyID=cebbacd8-c094-4255-b702-de3bb768148f&DisplayLang=en>, Author unknown.
David Youd, "*What is a Digital Signature?*", pp. 1-4 [online]. Retrieved on Jul. 21, 2006. Retrieved from the Internet:<URL:http://www.youdzone.com/signature.html>.
Sobel, U.S. Appl. No. 11/860,060, filed Sep. 24, 2007, entitled "Software Publisher Trust Extension Application".

* cited by examiner

*Primary Examiner* — Emerson Puente
*Assistant Examiner* — Jonathan R Labud
(74) *Attorney, Agent, or Firm* — Wilmer Cutler Pickering Hale and Dorr LLP

(57) ABSTRACT

A determination is made as to whether a creator of a created executable file is a trusted installer, e.g., a digitally signed installer. Upon a determination that the creator is a trusted installer, the created executable file is defined as a trusted file. By bestowing the trust of a trusted installer to the executable files that the installer creates, suspicious behavior by the created executable files and associated processes, which otherwise would be blocked, is allowed. In this manner, false positives, e.g., blocking of legitimate behavior by the created executable file and associated process(es), are avoided.

16 Claims, 4 Drawing Sheets

INSTALLER TRUST CHAIN VALIDATION

BACKGROUND

1. Field of the Invention

The present invention relates to computer system security. More particularly, the present invention relates to a system and method of reducing false positives of a behavior blocking system of a computer system.

2. Description of the Related Art

A behavior blocking system heuristically monitors processes and blocks suspicious behavior that the behavior blocking system considers as malicious. Although behavior may be suspicious, in certain instances, the behavior is legitimate, i.e., is not associated with malicious code. Accordingly, blocking the legitimate behavior is undesirable and sometimes is referred to as a false positive.

Accordingly, assessing the trust level of a process is very important in behavior blocking. More particularly, for a trusted process, legitimate behavior, which otherwise would be blocked, is allowed.

There are a number of ways to assess the trust level of a process. One of the best is a digital signature on the process file itself. Unfortunately, many files are not signed.

SUMMARY OF THE INVENTION

In accordance with one embodiment, a determination is made as to whether a creator of a created executable file is a trusted installer. Upon a determination that the creator is a trusted installer, the created executable file is defined as a trusted file.

By bestowing the trust of a trusted installer to the executable files that the installer creates, suspicious behavior by the created executable files and associated processes, which otherwise would be blocked, is allowed. In this manner, false positives, e.g., blocking of legitimate behavior by the created executable file and associated process(es), are avoided.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 2:
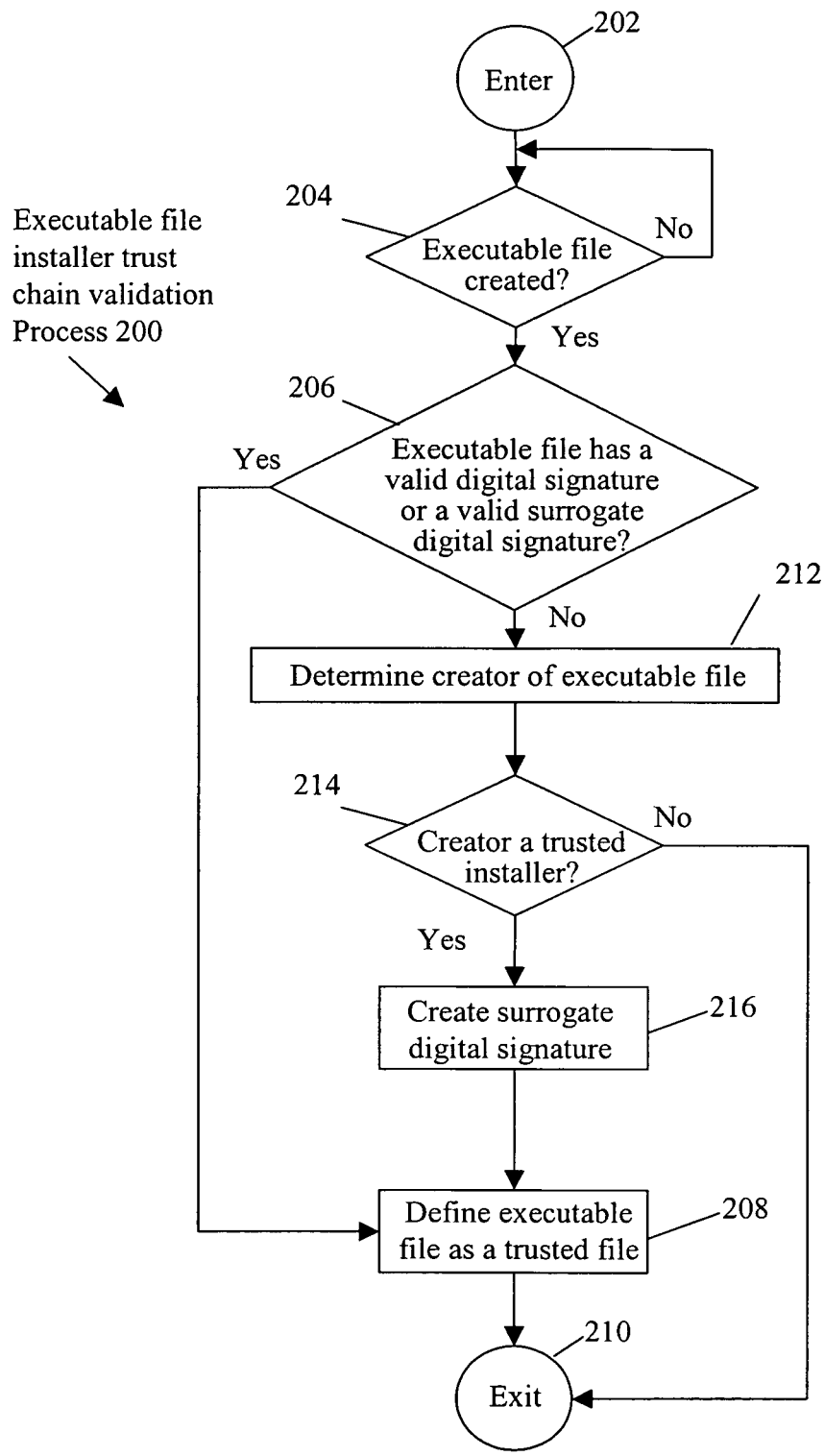
FIG. 2 is a flow diagram of an executable file installer trust chain validation process in accordance with one embodiment of the present invention.

In accordance with one embodiment, referring to FIG. 2, a determination is made as to whether a creator of a created executable file is a trusted installer (OPERATION 214). Upon a determination that the creator is a trusted installer, the created executable file is defined as a trusted file (OPERATION 208).

By bestowing the trust of a trusted installer to the executable files that the installer creates, suspicious behavior by the created executable files and associated processes, which otherwise would be blocked, is allowed. In this manner, false positives, e.g., blocking of legitimate behavior by the created executable file and associated process(es), are avoided.

Figure 1:
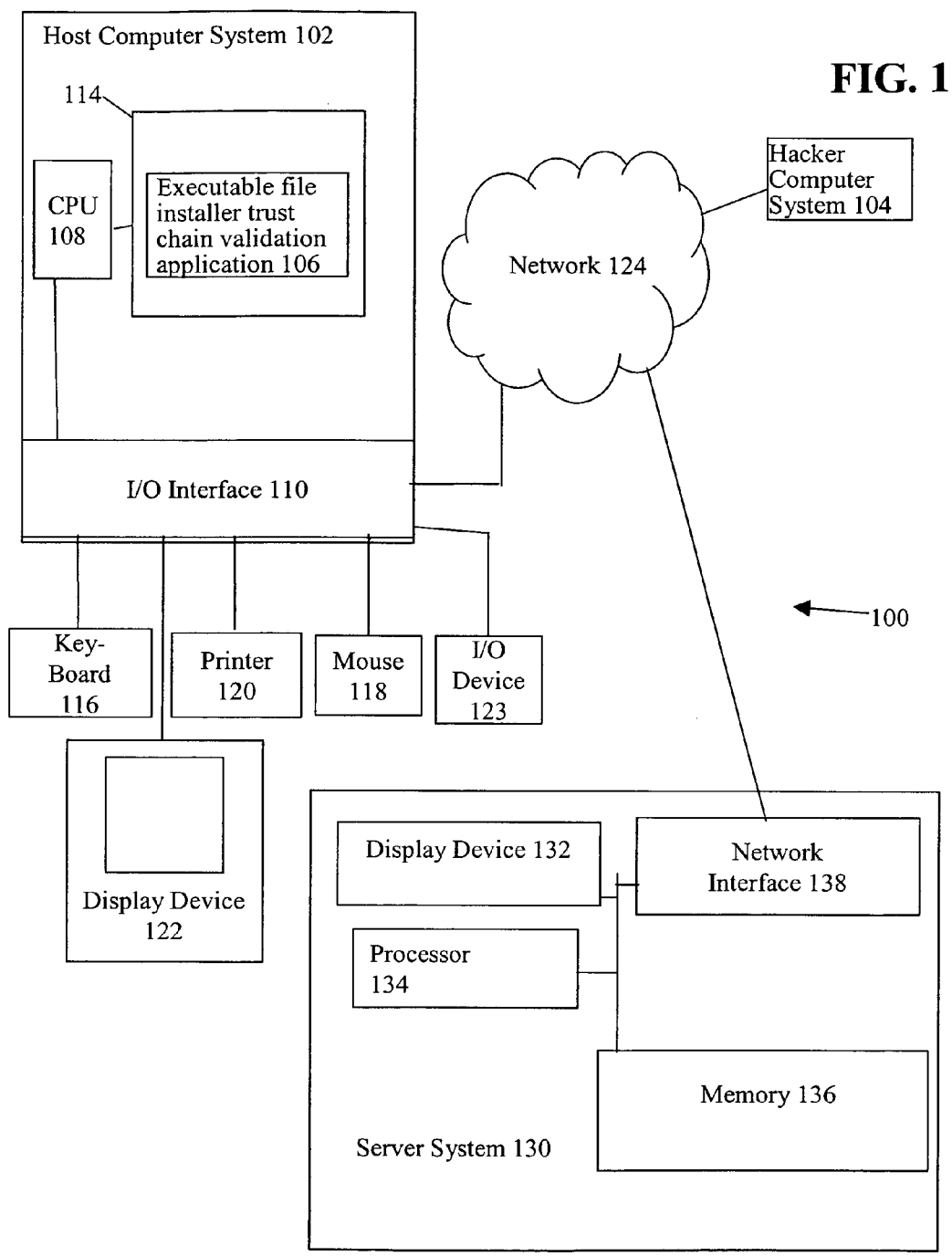
FIG. 1 is a diagram of a client-server system that includes an executable file installer trust chain validation application executing on a host computer system in accordance with one embodiment of the present invention.

More particularly, FIG. 1 is a diagram of a client-server system 100 that includes an executable file installer trust chain validation application 106 executing on a host computer system 102 in accordance with one embodiment of the present invention.

Host computer system 102, sometimes called a client or user device, typically includes a central processing unit (CPU) 108, sometimes called a processor 108, an input/output (I/O) interface 110, and a memory 114. Host computer system 102 further includes standard devices like a keyboard 116, a mouse 118, a printer 120, and a display device 122, as well as one or more standard input/output (I/O) devices 123, such as a compact disk (CD) or DVD drive, floppy disk drive, or other digital or waveform ports for inputting data to and outputting data from host computer system 102.

In one embodiment, executable file installer trust chain validation application 106 is loaded into host computer system 102 via I/O device 123, such as from a CD, DVD, or floppy disk containing executable file installer trust chain validation application 106.

Host computer system 102 is coupled to a server system 130 of computer system 100 by a network 124. Server system 130 typically includes a display device 132, a processor 134, a memory 136, and a network interface 138. Additional computer systems such as a hacker, e.g., a second, computer system 104 are also associated with network 124.

Network 124 can be any network or network system that is of interest to a user. In various embodiments, network interface 138 and I/O interface 110 include analog modems, digital modems, or a network interface card.

Executable file installer trust chain validation application 106 is stored, for example, in memory 114 of host computer system 102 and executed on host computer system 102.

The particular type of and configuration of host computer system 102, server system 130, and hacker computer system 104 are not essential to this embodiment of the present invention.

Herein, in one embodiment, malicious code is defined as any computer program, module, set of modules, or code that enters a computer system environment without an authorized user's knowledge and/or without an authorized user's consent. A computer virus is one example of a malicious code. For example, the malicious code is propagated from hacker computer system 104 to host computer system 102.

FIG. 2 is a flow diagram of an executable file installer trust chain validation process 200 in accordance with one embodiment of the present invention. Referring now to FIGS. 1 and 2 together, in one embodiment, execution of executable file installer trust chain validation application 106 by processor 108 results in the operations of executable file installer trust chain validation process 200 as described below.

From an ENTER OPERATION 202, flow moves to an EXECUTABLE FILE CREATED CHECK OPERATION 204. In EXECUTABLE FILE CREATED CHECK OPERATION 204, a determination is made as to whether an executable file is created on disk. An executable file is a file that is executable, i.e., is a file that the host computer system can directly execute. In one example, an executable file has a .exe extension (an EXE file) but has other extensions in other embodiments. The determination about whether an executable file has been created can be made using any one of a number of techniques well known to those of skill in the art, and the particular technique used is not essential to this embodiment.

If a determination is made that an executable file is not created, flow remains at EXECUTABLE FILE CREATED CHECK OPERATION 204. Conversely, upon a determination that an executable file is created, flow moves from EXECUTABLE FILE CREATED CHECK OPERATION 204 to an EXECUTABLE FILE HAS A VALID DIGITAL SIGNATURE OR A VALID SURROGATE DIGITAL SIGNATURE CHECK OPERATION 206.

In EXECUTABLE FILE HAS A VALID SIGNATURE OR A VALID SURROGATE DIGITAL SIGNATURE CHECK OPERATION 206, a determination is made as to whether the created executable file has a valid digital signature or a valid surrogate digital signature. A file that has a valid digital signature is sometimes called a digitally signed file.

A digital signature is digital code that is attached to a file. Digital signatures are well known to those of skill in the art and generally serve to authenticate and validate a file. In one embodiment, authentication ensures that the file is in fact from the purported sender. Validation ensures that the file has not been modified, e.g., during transit.

In one embodiment, a digital signature is created using mathematical formulas that encrypt a hash of the file with a private key. A recipient of the digitally signed file uses the public key corresponding to the private key to authenticate and validate the file.

As is also well known to those of skill in the art, the public key is published using a digital certificate. Stated another way, a digital certificate is a package that includes the public key. To insure that the digital certificate and thus public key are authentic and valid, digital certificates are often digitally signed by a trusted third party, e.g., a certificate authority center.

In accordance with one embodiment, a file has a valid digital signature if the associated digit certificate is valid and issued from a reputable certificate authority center, and the file is authenticated and validated using the digital signature.

In accordance with another embodiment, a file has a valid surrogate digital signature if the associated surrogate digit certificate is valid, and the file is a validated using the surrogate digital signature. As discussed further below, a surrogate digital signature is used to validate that the created executable file has not been corrupted or otherwise manipulated subsequent to the creation of the surrogate digital signature. A surrogate digital signature is similar to a standard digital signature, except that the surrogate digital signature does not have a digital certificate signed by a certificate authority center in one embodiment. Illustratively, the created executable file has previously been defined as a trusted file and had the associated surrogate digital signature created in a manner similar to that discussed below.

If a determination is made that the executable file does have a valid digital signature or a valid surrogate digital signature, flow moves from EXECUTABLE FILE HAS A VALID DIGITAL SIGNATURE OR A VALID SURROGATE DIGITAL SIGNATURE CHECK OPERATION 206 to a DEFINE EXECUTABLE FILE AS A TRUSTED FILE OPERATION 208. In DEFINE EXECUTABLE FILE AS A TRUSTED FILE OPERATION 208, the executable file created is defined as a trusted file. In one example, a trusted file is a file which is trusted, i.e., is bestowed a trusted status. Generally, a trusted file is a file with an assurance that the file is safe, e.g., does not contain malicious code. Illustratively, behavior from a process created by execution of a trusted file, which otherwise would be blocked by a behavior blocking application, is allowed based on the trusted status of the trusted file.

From DEFINE EXECUTABLE FILE AS A TRUSTED FILE OPERATION 208, flow moves to and exits at an EXIT OPERATION 210 or returns to EXECUTABLE FILE CREATED CHECK OPERATION 204 and awaits the creation of the next executable file.

Returning again to EXECUTABLE FILE HAS A VALID DIGITAL SIGNATURE OR A VALID SURROGATE DIGITAL SIGNATURE CHECK OPERATION 206, if a determination is made that the created executable file does not have a valid digital signature or a valid surrogate digital signature, flow moves to a DETERMINE CREATOR OF EXECUTABLE FILE OPERATION 212. In DETERMINE CREATOR OF EXECUTABLE FILE OPERATION 212, the creator of the created executable file is determined. In one embodiment, the creator is an executable file. Execution of the creator creates the new executable file. The creator of the new executable file can be determined using any one of a number of techniques and the particular technique used is not essential to this embodiment.

From DETERMINE CREATOR OF EXECUTABLE FILE OPERATION 212, flow moves to a CREATOR A TRUSTED INSTALLER CHECK OPERATION 214. In CREATOR A TRUSTED INSTALLER CHECK OPERATION 214, a determination is made as to whether the creator is a trusted installer, e.g., a digitally signed installer. In one embodiment, a digitally signed installer is an installer that has a valid digital signature. A digitally signed installer is a trusted file.

As is well known to those of skill in the art, an installer is an applications installation and configuration service. An installer manages the installation of applications by applying a set of defined setup rules during the installation process. More particularly, an installer places files and makes other configuration changes on the host computer system, sometimes called the target machine.

Generally, an installer is responsible for, sometimes called vouches for or attests to, the files created by the installer. An installer should take reasonable precautions to insure that the files created by the installer are valid and authentic. An installer should be contrasted to a portal such as a web browser, which is an application used to download files, but which otherwise has no relationship to the downloaded files.

To illustrate, a user of a host computer system desires to download and install a new application on the host computer system from a website. To install the application, the user downloads an installer, i.e., an executable file. Execution of the installer installs the application on the host computer system. Illustratively, execution of the installer creates new executable files, .dlls, registry keys, shortcuts, and so on.

For security purposes, installers are often digitally signed. An installer with a valid digital signature is sometimes called a digitally signed installer.

However, many installers are not digitally signed, and the user of the host computer system may receive a warning, e.g., from Internet Explorer 6 and its higher security checking, to this effect prior to downloading of the un-signed installer from the Internet. An installer without a valid digital signature is sometimes called an un-signed installer.

One specific example of an installer is a Microsoft® Windows® Installer, sometimes called an MSI installer. Although one example of an installer is set forth, in other embodiments, there are installers other than MSI installers, sometimes called stand-alone installers.

A trusted installer is an installer that is trusted. In one embodiment, a digitally signed installer is the only trusted installer. However, in other embodiments, other installers are trusted.

For example, an un-signed installer is trusted based on the location of the un-signed installer. For example, if the location of the un-signed installer indicates that the un-signed installer should be trusted, e.g., the un-signed installer is on a CD or DVD, the un-signed installer is defined as a trusted installer.

If a determination is made that the creator is not a trusted installer in CREATOR A TRUSTED INSTALLER CHECK OPERATION 214, flow moves to and exits at EXIT OPERATION 210 or returns to EXECUTABLE FILE CREATED CHECK OPERATION 204 and awaits the creation of the next executable file. In this event, the created executable file does not have a valid digital signature or a valid surrogate digital signature and the creator of the executable file is also not a trusted installer. Accordingly, the created executable file is not a trusted file or created by a trusted file. Thus, the created executable file is not given an elevated level of trust but is treated as any other non-trusted executable file.

Conversely, if a determination is made that the creator is a trusted installer in CREATOR A TRUSTED INSTALLER CHECK OPERATION 214, flow moves to a CREATE SURROGATE DIGITAL SIGNATURE OPERATION 216. In CREATE SURROGATE DIGITAL SIGNATURE OPERATION 216, a surrogate digital signature for the created executable file is created. A surrogate digital signature can be created using any one of a number of techniques, and the particular technique used is not essential to this embodiment. Generally, the surrogate digital signature is used to validate that the created executable file has not been corrupted or otherwise manipulated subsequent to the creation of the surrogate digital signature. A surrogate digital signature is similar to a standard digital signature, except that the surrogate digital signature does not have a digital certificate signed by a certificate authority center in one embodiment.

From CREATE SURROGATE DIGITAL SIGNATURE OPERATION 216, flow moves to DEFINE EXECUTABLE FILE AS A TRUSTED FILE OPERATION 208, which is performed as discussed above. More particularly, in DEFINE EXECUTABLE FILE AS A TRUSTED FILE OPERATION 208, the created executable file is defined as a trusted file in a manner similar to that discussed above.

In this manner, an executable file created by a trusted installer is bestowed (conveyed) the trust of the trusted installer. Further, a surrogate digital signature is created for the executable file. The surrogate digital signature is used to validate that the executable file has not been corrupted or otherwise manipulated. More particularly, the surrogate digital signature is used to validate the executable file in a manner similar to the usage of a digital signature to validate any other file, except that the surrogate digital signature does not have a digital certificate signed by a certificate authority center in one embodiment.

As set forth below, by bestowing the trust of a trusted installer to the executable files that the installer creates, suspicious behavior by the created executable files and associated processes, which otherwise would be blocked, is allowed. In this manner, false positives, e.g., blocking of legitimate behavior by the created executable file and associated process(es), are avoided.

Figure 3:
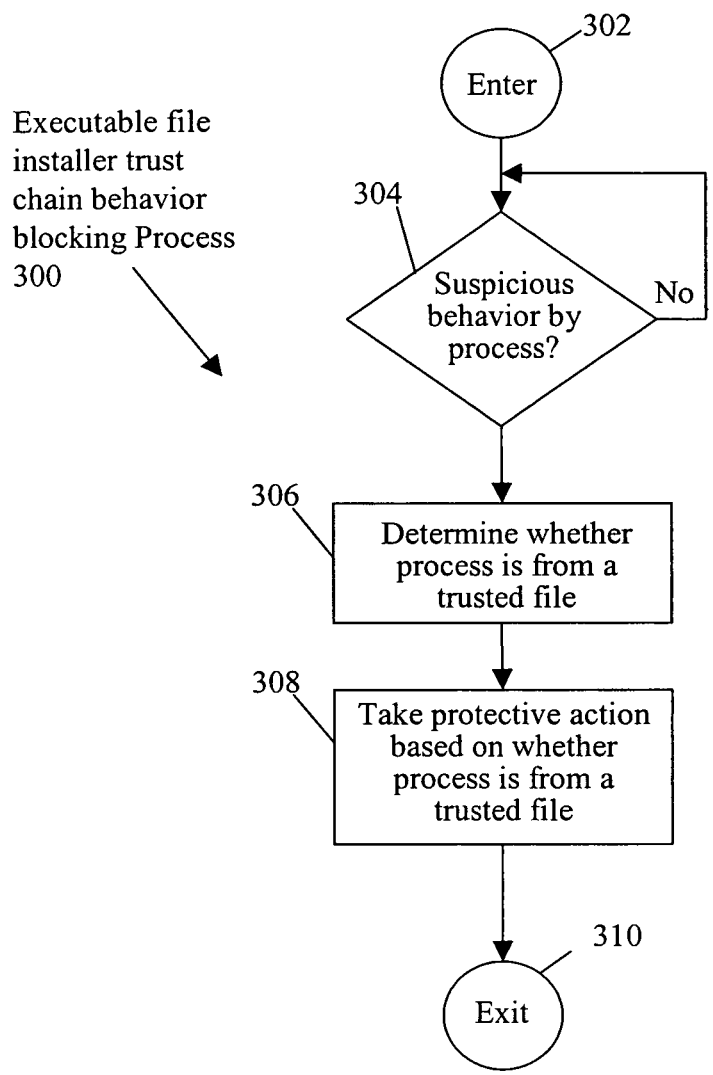
FIG. 3 is a flow diagram of an executable file installer trust chain behavior blocking process for detecting and removing malicious code in accordance with one embodiment of the present invention.

FIG. 3 is a flow diagram of an executable file installer trust chain behavior blocking process 300 for detecting and removing malicious code in accordance with one embodiment of the present invention. Referring now to FIGS. 1 and 3 together, in one embodiment, execution of executable file installer trust chain validation application 106 by processor 108 results in the operations of executable file installer trust chain behavior blocking process 300 as described below.

From an ENTER OPERATION 302, flow moves to a SUSPICIOUS BEHAVIOR BY PROCESS CHECK OPERATION 304. In SUSPICIOUS BEHAVIOR BY PROCESS CHECK OPERATION 304, a determination is made as to whether there is suspicious behavior by a process. As used herein, suspicious behavior is behavior that is, or is likely to be, associated with malicious code. Illustratively, the suspicious behavior is detected by a behavior blocking application, e.g., a module of executable file installer trust chain validation application 106.

If a determination is made that there is no suspicious behavior by a process, flow remains at SUSPICIOUS BEHAVIOR BY PROCESS CHECK OPERATION 304. Conversely, upon a determination that there is suspicious behavior by process, flow moves from SUSPICIOUS BEHAVIOR BY PROCESS CHECK OPERATION 304 to a DETERMINE WHETHER PROCESS IS FROM A TRUSTED FILE OPERATION 306.

In DETERMINE WHETHER PROCESS IS FROM A TRUSTED FILE OPERATION 306, a determination is made as to whether the process that exhibited the suspicious behavior is from a trusted file.

As those of skill in the art understand, execution of an executable file creates a process. Accordingly, in DETERMINE WHETHER PROCESS IS FROM A TRUSTED FILE OPERATION 306, the file associated with the process, e.g., the file executed to create the process, is identified using any one of a number of techniques well-known to those of skill in the art. A determination is made as to whether the file is a trusted file. As set forth above, a trusted file has a valid digital signature or has a valid surrogate digital signature. Ensuring that the file has a valid digital signature or a valid surrogate digital signature validates that the file has not been modified or otherwise tampered with.

From DETERMINE WHETHER PROCESS IS FROM A TRUSTED FILE OPERATION 306, flow moves to a TAKE PROTECTIVE ACTION BASED ON WHETHER PROCESS IS FROM A TRUSTED FILE OPERATION 308. In TAKE PROTECTIVE ACTION BASED ON WHETHER PROCESS IS FROM A TRUSTED FILE OPERATION 308, the protective action, if any, for the suspicious behavior is taken.

A factor in determining the protective action necessary is whether the process is from a trusted file or not. If the process is from a trusted file, the process will be bestowed an elevated trust. In one embodiment, a determination is made that little or no protective action is necessary, e.g., the suspicious behavior is legitimate behavior. In one embodiment, whether the process is from a trusted file or not is simply a factor and not absolutely determinative, e.g., certain behavior is not allowed even from a process from a trusted file.

Conversely, if the process is not from a trusted file, in one embodiment, a determination is made that the suspicious behavior is malicious. In this event, a determination is made that protective action is necessary to protect the host computer system. In various embodiments, any one of a number of protective actions are taken, e.g., the suspicious behavior is blocked, the process is terminated and/or the associated file is removed.

From TAKE PROTECTIVE ACTION BASED ON WHETHER PROCESS IS FROM A TRUSTED FILE OPERATION 308, flow moves to and exits at an EXIT OPERATION 310 or returns to SUSPICIOUS BEHAVIOR BY PROCESS CHECK OPERATION 304 and awaits the next suspicious behavior.

Figure 4:
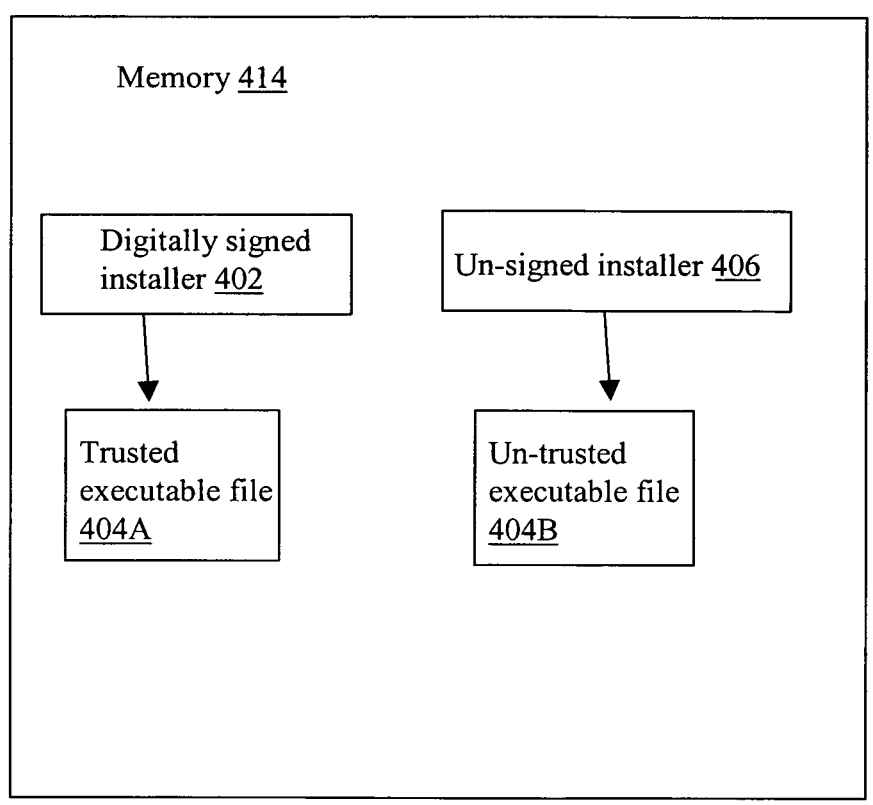
FIG. 4 is a block diagram illustrating executable file installer trust chain validation of an executable file in accordance with one embodiment of the present invention.

FIG. 4 is a block diagram 400 illustrating executable file installer trust chain validation of an executable file 404A in accordance with one embodiment of the present invention. Referring now to FIGS. 1 and 4 together, a memory 414, e.g., a part of memory 114 of host computer system 102, includes a digitally signed installer 402 and an un-signed installer 406. Execution of digitally signed installer 402 creates a trusted executable file 404A. Stated another way, digitally signed installer 402 is the creator of trusted executable file 404A.

Execution of un-signed installer 406 creates an un-trusted executable file 404B. Stated another way, un-signed installer 406 is the creator of un-trusted executable file 404B. Trusted executable file 404A is identical to un-trusted executable file 404B, e.g., are instances of the same executable file.

Referring now to FIGS. 2 and 4 together, for purposes of illustration, assume that trusted executable file 404A is being created by digitally signed installer 402. Upon determining that trusted executable file 404A has been created in EXECUTABLE FILE CREATED CHECK OPERATION 204, flow moves to EXECUTABLE FILE HAS A VALID DIGITAL SIGNATURE OR A VALID SURROGATE DIGITAL SIGNATURE CHECK OPERATION 206. In this case, trusted executable file 404A does not have a valid digital signature or a valid surrogate digital signature, and flow moves to DETERMINE CREATOR OF EXECUTABLE FILE OPERATION 212.

In DETERMINE CREATOR OF EXECUTABLE FILE OPERATION 212, a determination is made that digitally signed installer 402 is the creator of trusted executable file 404A, and flow moves to CREATOR A TRUSTED INSTALLER CHECK OPERATION 214.

In CREATOR A TRUSTED INSTALLER CHECK OPERATION 214, a determination is made that the creator, i.e., digitally signed installer 402, is a trusted installer. Accordingly, flow moves to CREATE SURROGATE DIGITAL SIGNATURE OPERATION 216.

In CREATE SURROGATE DIGITAL SIGNATURE OPERATION 216, a surrogate digital signature is created for trusted executable file 404A. Finally, in DEFINE EXECUTABLE FILE AS A TRUSTED FILE OPERATION 208, trusted executable file 404A is defined as a trusted file.

Conversely, assume that un-trusted executable file 404B is being created by un-signed installer 406. Upon determining that un-trusted executable file 404B has been created in EXECUTABLE FILE CREATED CHECK OPERATION 204, flow moves to EXECUTABLE FILE HAS A VALID DIGITAL SIGNATURE OR A VALID SURROGATE DIGITAL SIGNATURE CHECK OPERATION 206. In this case, un-trusted executable file 404B does not have a valid digital signature or a valid surrogate digital signature, and flow moves to DETERMINE CREATOR OF EXECUTABLE FILE OPERATION 212.

In DETERMINE CREATOR OF EXECUTABLE FILE OPERATION 212, a determination is made that un-signed installer 406 is the creator of un-trusted executable file 404B, and flow moves to CREATOR A TRUSTED INSTALLER CHECK OPERATION 214.

In CREATOR A TRUSTED INSTALLER CHECK OPERATION 214, a determination is made that the creator, i.e., un-signed installer 406, is not a trusted installer. Accordingly, flow moves to and exits at EXIT OPERATION 210.

As this illustration demonstrates, executable files 404A, 404B, which are instances of the same executable file, are bestowed different levels of trust depending upon the creator of the executable file. More particularly, the trust of digitally signed installer 402 is bestowed to files created by digitally signed installer 402, i.e., to trusted executable file 404A. This transference of trusted from a trusted installer to files created by the trusted installer is sometimes called a trust chain.

Referring again to FIG. 1, although executable file installer trust chain validation application 106 is referred to as an application, this is illustrative only. Executable file installer trust chain validation application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention is carried out using any suitable hardware configuration or means involving a personal computer, a workstation, a portable device, or a network of computer devices. Other network configurations other than client-server configurations, e.g., peer-to-peer, web-based, intranet, and internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code. In another embodiment, a computer program product comprises a tangible medium configured to store computer readable code including CD-ROM discs, DVDs, ROM cards, floppy discs, magnetic tapes, computer hard drives and servers on a network.

As illustrated in FIG. 1, this medium belongs to the computer system itself. However, the medium is also removed from the computer system. For example, executable file installer trust chain validation application 106 is stored in memory that is physically located in a location different from processor 108, e.g., memory 136 of server system 130. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that execute executable file installer trust chain validation application 106 in accordance with at least one of the embodiments as described herein. Similarly, in another embodiment, host computer system 102 and/or server system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, executable file installer trust chain validation application 106 in accordance with one embodiment of the present invention can be implemented in a wide variety of computer system configurations. In addition, executable file installer trust chain validation application 106 could be stored as different modules in memories of different devices. For example, executable file installer trust chain validation application 106 could initially be stored in server system 130, and as necessary, a portion of executable file installer trust chain validation application 106 could be transferred to host computer system 102 and executed on host computer system 102. Consequently, part of the executable file installer trust chain validation functionality would be executed on processor 134 of server system 130, and another part would be executed on processor 108 of host computer system 102. In view of this disclosure, those of skill in the art can implement various embodiments of the present invention in a wide variety of physical hardware configurations using an operating system and computer programming language of interest to the user.

In yet another embodiment, executable file installer trust chain validation application 106 is stored in memory 136 of server system 130. Executable file installer trust chain validation application 106 is transferred over network 124 to memory 114 in host computer system 102. In this embodiment, network interface 138 and I/O interface 110 would include analog modems, digital modems, or a network interface card. If modems are used, network 124 includes a communications network, and executable file installer trust chain validation application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer-program product comprising a non-transitory computer readable storage medium containing computer program code comprising:
    an executable file installer trust chain validation application for determining whether a creator of a created executable file in a local filesystem is a trusted installer, wherein said determining comprises:
        receiving an indication of suspicious behavior from a behavior blocking application resulting from execution of said created executable file; and
        checking whether said created executable file is a trusted file, wherein said checking comprises determining that said creator is unsigned and determining that a location of said unsigned creator within said local filesystem indicates that said unsigned creator should be trusted,
    wherein upon a determination that said creator is said trusted installer, said executable file installer trust chain validation application further defines said created executable file as a trusted file.

2. The computer-program product of claim 1 wherein said creator is an executable file, and wherein execution of said creator creates said created executable file.

3. The computer-program product of claim 1 wherein said trusted installer vouches for said created executable file.

4. The computer-program product of claim 1 wherein said created executable file is bestowed trust of said trusted installer.

5. The computer-program product of claim 1 wherein said executable file installer trust chain validation application is further for determining that said created executable file has been created.

6. The computer-program product of claim 1 wherein said executable file installer trust chain validation application is further determining whether said created executable file has a valid digital signature or a valid surrogate digital signature.

7. The computer-program product of claim 1 wherein upon determining that said created executable file has said valid digital signature or said valid surrogate digital signature, said executable file installer trust chain validation application is further for defining said created executable file as a trusted file.

8. The computer-program product of claim 1 wherein said executable file installer trust chain validation application is further determining said creator.

9. The computer-program product of claim 1 wherein upon a determination that said creator is said trusted installer, said executable file installer trust chain validation application further for creating a surrogate digital signature for said created executable file.

10. The computer-program product of claim 1 wherein said executable file installer trust chain validation application is further for detecting suspicious behavior by a process.

11. The computer-program product of claim 10 wherein upon said detecting suspicious behavior, said executable file installer trust chain validation application is further for determining whether said process is from a trusted file.

12. The computer-program product of claim 11 wherein said executable file installer trust chain validation application is further for taking protective action to protect a computer system upon a determination that said process is not from said trusted file.

13. The computer-program product of claim 11 wherein upon a determination that said process is from said trusted file, said executable file installer trust chain validation application is further for allowing said suspicious behavior.

14. A computer system comprising:
    a memory having stored therein an executable file installer trust chain validation application; and
    a processor coupled to said memory, wherein execution of said executable file installer trust chain validation application generates a method comprising:
        receiving an indication of suspicious behavior from a behavior blocking application resulting from execution of said created executable file;
        checking whether said created executable file is a trusted file, wherein said checking comprises determining whether a creator of a created executable file in a local filesystem is a trusted installer based on a determination that said creator is unsigned and a determination that a location of said unsigned creator within said local filesystem indicates that said unsigned creator should be trusted; and
        defining said created executable file as a trusted file upon a determination that said creator is said trusted installer.

15. A computer system comprising:
    means for determining whether a creator of a created executable file in a local filesystem is a trusted installer, wherein said determining comprises:
    receiving an indication of suspicious behavior from a behavior blocking application resulting from execution of said created executable file; and
    checking whether said created executable file is a trusted file, wherein said checking comprises determining that said creator is unsigned and determining that a location of said unsigned creator within said local filesystem indicates that said unsigned creator should be trusted; and means for defining said created executable file as a trusted file upon a determination that said creator is said trusted installer.

16. A computer-program product comprising a tangible non-transitory computer readable medium containing computer program code comprising:

an executable file installer trust chain validation application for detecting suspicious behavior by a process and for determining whether a creator of a created executable file in a local filesystem is a trusted installer, wherein said determining comprises:

receiving an indication of suspicious behavior from a behavior blocking application resulting from execution of said created executable file; and checking whether said created executable file is a trusted file, wherein said checking comprises determining that said creator is unsigned and determining that a location of said unsigned creator within said local filesystem indicates that said unsigned creator should be trusted, wherein upon a determination that said creator is said trusted installer, said executable file installer trust chain validation application further defines said created executable file as a trusted file, wherein said creator is an executable file, and wherein execution of said creator creates said created executable file, wherein said created executable file is bestowed trust of said trusted installer.

* * * * *